United States Patent
McGaw, Jr.

(10) Patent No.: US 7,083,722 B2
(45) Date of Patent: Aug. 1, 2006

(54) FILTER MANUFACTURING PROCESS USING A COMBINED WELDING AND CUTTING STEP

(75) Inventor: Steven B. McGaw, Jr., Durand, IL (US)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 10/243,884

(22) Filed: Sep. 13, 2002

(65) Prior Publication Data

US 2003/0019907 A1    Jan. 30, 2003

Related U.S. Application Data

(62) Division of application No. 09/543,273, filed on Apr. 5, 2000, now Pat. No. 6,451,205.

(60) Provisional application No. 60/127,763, filed on Apr. 5, 1999.

(51) Int. Cl.
*B01D 35/027* (2006.01)
*B01D 29/15* (2006.01)
*B29C 65/08* (2006.01)
*B32B 31/18* (2006.01)

(52) U.S. Cl. .............. 210/168; 210/232; 210/461; 210/489; 210/416.5; 156/73.1; 156/73.3; 156/73.4; 156/580.1; 156/580.2; 264/232; 264/234; 264/413; 264/DIG. 48

(58) Field of Classification Search .............. 210/168, 210/172, 232, 461, 489, 416.5; 156/73.1, 156/73.3, 73.4, 580.1, 580.2; 264/232, 234, 264/413, DIG. 48
See application file for complete search history.

(56) References Cited

U.S. PATENT DOCUMENTS

| | | | |
|---|---|---|---|
| 3,939,033 A | 2/1976 | Grach et al. | |
| 4,256,529 A | 3/1981 | Clarke et al. | |
| 4,446,352 A | 5/1984 | O'Cheskey et al. | |
| 4,690,722 A | 9/1987 | Flood | |
| 5,011,555 A | 4/1991 | Sager | |
| 5,049,274 A | 9/1991 | Leason et al. | |
| 5,055,187 A * | 10/1991 | Ito et al. | 210/172 |
| 5,174,841 A | 12/1992 | Combest | |
| 5,395,520 A | 3/1995 | Ito et al. | |
| 5,547,568 A | 8/1996 | Sasaki | |
| 5,665,229 A | 9/1997 | Fitzpatrick et al. | |
| 5,699,683 A | 12/1997 | Rieker | |
| 5,716,522 A * | 2/1998 | Chilton et al. | 210/317 |
| 5,902,480 A * | 5/1999 | Chilton et al. | 210/317 |
| 5,928,507 A | 7/1999 | Chiga | |
| 6,451,205 B1 | 9/2002 | McGaw, Jr. | |

FOREIGN PATENT DOCUMENTS

| | | |
|---|---|---|
| DE | 19513414 | 10/1996 |
| EP | 0 400 170 A1 | 12/1990 |
| EP | 0998 967 A2 | 5/2000 |
| JP | 1-306223 | 12/1989 |
| WO | WO 97/46800 | 12/1997 |

* cited by examiner

*Primary Examiner*—Thomas M. Lithgow
(74) *Attorney, Agent, or Firm*—Steven P. Shurtz; Brinks Hofer Gilson & Lione

(57) ABSTRACT

A method of manufacturing a filter comprises the steps of assembling multiple layers of filtration material on top of one another to form an assembly; holding the assembly between an ultrasonic weld horn and a weld nest so that the assembly has a marginal area outside of an edge formed on either the nest or the weld horn; and operating the weld horn so as to cause the marginal area to be cut off from the assembly at the edge and to simultaneously seal together the layers of filtration material of the remaining assembly at the edge. A filter made by the process and an apparatus used to practice the process are also disclosed.

11 Claims, 4 Drawing Sheets

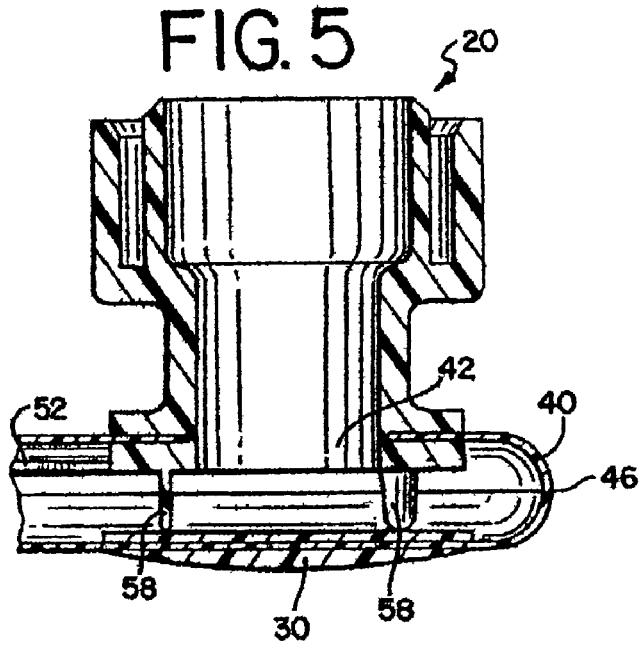
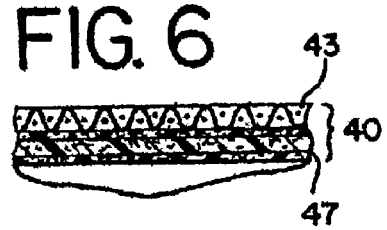
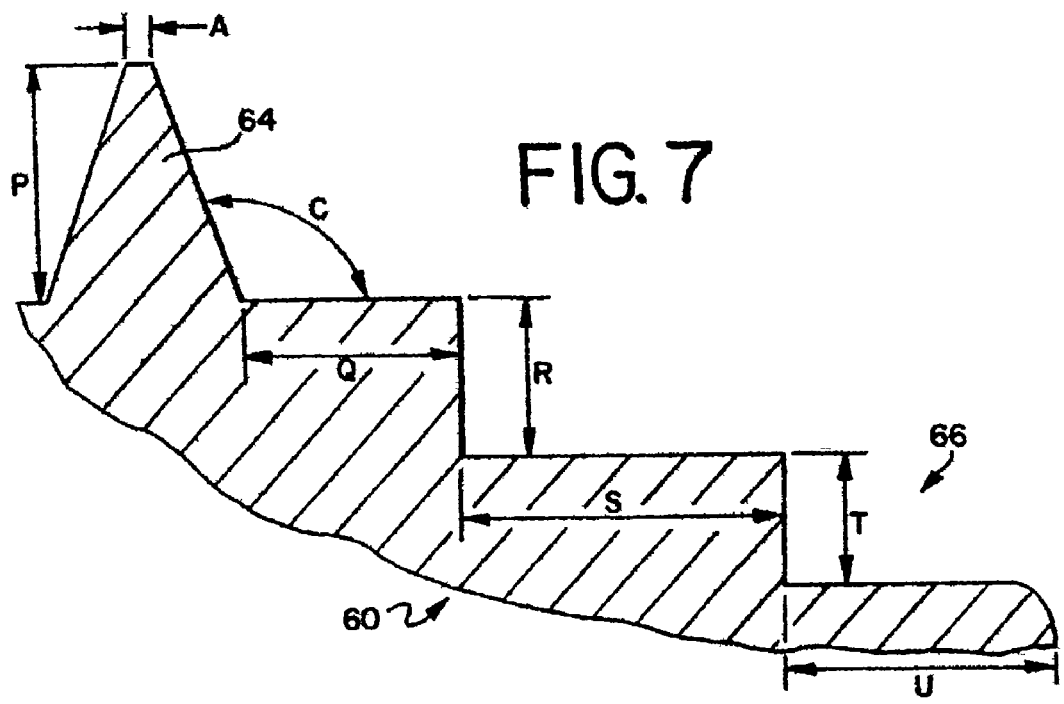

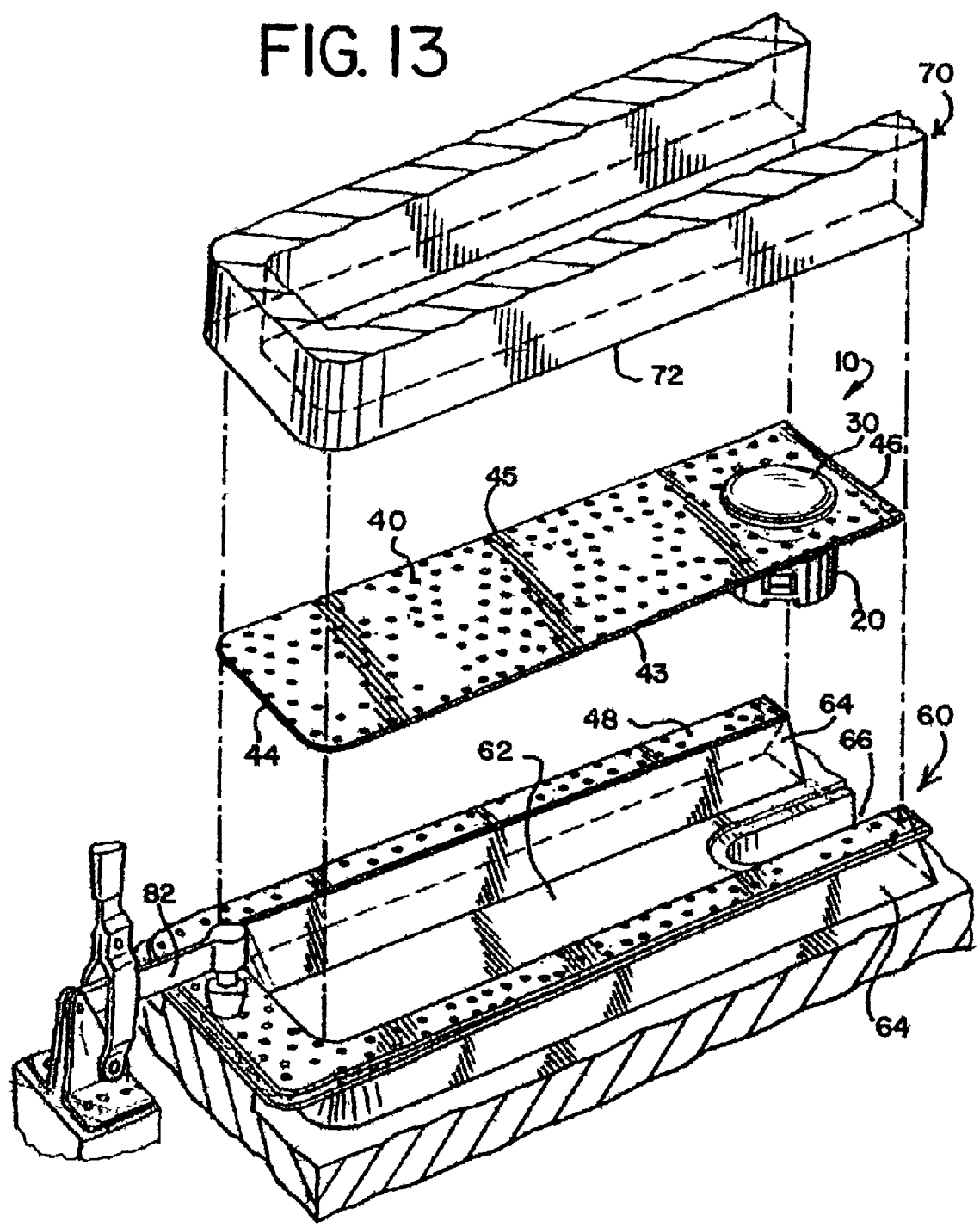

FILTER MANUFACTURING PROCESS USING A COMBINED WELDING AND CUTTING STEP

REFERENCE TO EARLIER FILED APPLICATIONS

The present application is a division of application Ser. No. 09/543,273, filed on Apr. 5, 2000, now U.S. Pat. No. 6,451,205, which claims the benefit of the filing date under 35 U.S.C. § 119(e) of provisional U.S. Patent Application Ser. No. 60/127,763, filed Apr. 5,1999, both of which are hereby incorporated by reference.

BACKGROUND OF THE INVENTION

The present invention relates to a method of manufacturing a filter, the apparatus used in the method and the filter produced by the method. More particularly, the invention relates to a method of making a filter in which multiple layers of filtration material are sealed together at the edges of the filter and marginal pieces of the filtration material are simultaneously trimmed off at the edges.

Many filters are made with multiple layers of filtration material. Some of these are of an envelope type, where fluid flows into or out of the envelope through all sides of the envelope. Others are unidirectional, where the layers form a series of filters through which the fluid flows one after the other.

Most filters are constructed by forming the filtration material in large quantities in relatively flat sheets. Filters are then constructed by dividing the large sheets of filtration material into individual units, such as by cutting or stamping. In the case of multilayer filters, multiple individual units may be stacked together in layers to form a series of filters. Often the edges of the filter units will be sealed together to prevent fluid from bypassing one of the filters in the series. In the case of a filter made from an envelope, one piece of filtration material may be folded over in half (or folded in some other manner) and the non-folded sides sealed together around the periphery of the filter. In either situation, the size of the individual filter units is usually slightly larger than the size of the desired final filter component. This makes it easier to stack layers of filtration material together or fold an individual filter unit over without worrying about exactness. Marginal edges of the filtration material are then trimmed off, usually after a seal has been made at the periphery of the filter.

A typical sealing mechanism for many filtration materials is ultrasonic welding. In this process layers of filtration material are clamped between a welding horn and an anvil, often referred to as a weld nest. Ultrasonic energy is transmitted to the welding horn. Friction between the layers of filtration material induced by the movement caused by the welding horn relative to the anvil causes the filtration material to heat up and fuse together.

The dimension of the welding horn has some practical limitations. If the welding horn is too narrow, the horn will not have very long endurance, and will need to be replaced frequently. If the interface between the horn and the anvil is not completely covered by filtration material, direct contact between the horn and the anvil will result, also causing damage to the horn.

As a result, most filters made by ultrasonic welding have a weld area of a quarter of an inch or wider. Especially for small filters, this means that a large percentage of the filtration material is fused together. The fused material is unusable for filtration.

After the welding step, the marginal areas of the filter are usually trimmed off, either to make the filter more aesthetically pleasing or because of space limitations when the filter is placed inside of a cavity. Typically, the trimming step is performed using a stamping operation and a steel ruled die. This involves a separate manufacturing step and tool, adding to the manufacturing cost of the filter. Minimizing the amount of filtration material involved in the weld would be an advantage, as would simplification of the manufacturing process.

BRIEF SUMMARY OF THE INVENTION

A process of manufacturing filters has been invented which overcomes both of the aforementioned problems. First, the method allows for a narrower ultrasonic welding seal to be made, reducing the amount of filtration material made unusable during the welding process. Second, the welding and trimming steps can be performed in a single manufacturing step.

In a first aspect, the invention is a method of manufacturing a filter comprising the steps of assembling multiple layers of filtration material on top of one another to form an assembly; holding the assembly between an ultrasonic weld horn and a weld nest so that the assembly has a marginal area outside of an edge formed on either the nest or the weld horn; and operating the weld horn so as to cause the marginal area to be cut off from the assembly at said edge and to simultaneously seal together the layers of filtration material of the remaining assembly at said edge.

In a second aspect, the invention is a filter comprising at least two layers of filtration material, each layer having side edges; the side edges of the two layers each having been formed by an ultrasonic weld tool severing a marginal area from a larger piece of filtration material; the side edges being sealed together by the ultrasonic weld tool simultaneously sealing the edges as they are formed by said severing.

In a third aspect, the invention is a fixture for assembling a filter comprising a) an ultrasonic weld horn and b) a weld nest; one of the weld horn and the nest having an edge, the other having a generally flat surface abutting said edge, the edge being sized and shaped so as to cause simultaneous cutting and sealing of multiple layers of filtration material, placed into the weld nest as part of an assembly, when the assembly is held between the weld horn and the nest and ultrasonic welding occurs.

BRIEF DESCRIPTION OF SEVERAL VIEWS OF THE DRAWINGS

FIG. 5 is an enlarged partial cross-sectional view taken along line 5—5 of FIG. 2.

FIG. 6 is an enlarged partial cross-sectional view taken along line 6—6 of FIG. 4.

FIG. 7 is an enlarged partial cross-sectional view of a portion of a weld nest used to make the filter of FIG. 1.

FIG. 13 is a perspective partially schematic view of a welding operation used to make the filter of FIG. 1.

DETAILED DESCRIPTION OF THE DRAWINGS AND THE PREFERRED EMBODIMENTS OF THE INVENTION

Figure 1:
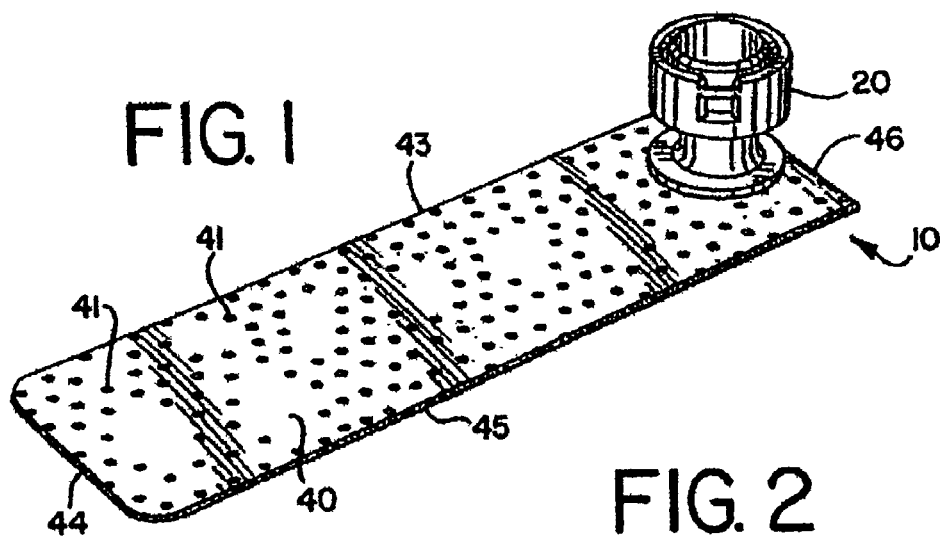
FIG. 1 is a perspective view of a preferred filter of the present invention.
Figure 2:
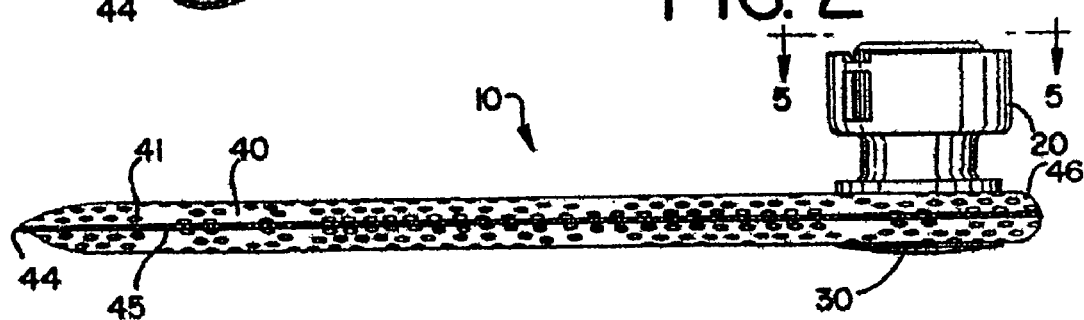
FIG. 2 is a side elevational view of the filter of FIG. 1.
Figure 3:
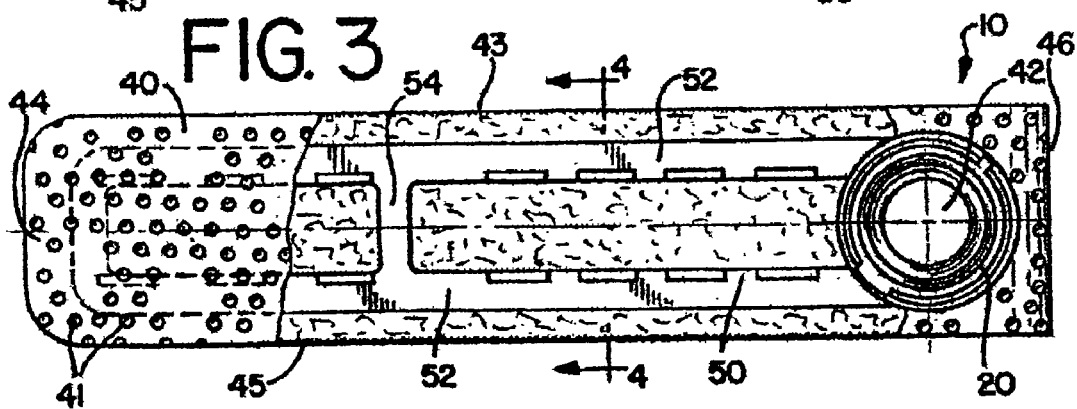
FIG. 3 is a top plan view of the filter of FIG. 1.

A preferred embodiment of the filter 10 of the present invention is shown in FIGS. 1–6. In the embodiment shown, the filter is a fuel tank filter formed with fitment 20 in the form of a connector for connecting the filter 10 to a fuel pump inside of an automobile fuel tank. As shown in FIGS. 2 and 5, the filter 10 preferably includes a wear surface 30 attached to the bottom side of filter 10. The wear surface 30 is primarily used to allow the filter 10 to be connected to a fuel pump without damaging the filtration material 40. If the filter 10 engages the bottom of the fuel tank, the wear surface 30 also prevents damage to the filtration material 40.

The filter 10 is formed of an envelope of filtration material 40. A spacer 50 (best seen in FIGS. 3 and 4) holds the envelope open, allowing fuel to enter the envelope through both the top and bottom surfaces of the envelope. Fuel passes out of the envelope through opening 42 (FIG. 3) in the filtration material 40. The opening 42 is surrounded by the fitment 20.

Figure 4:
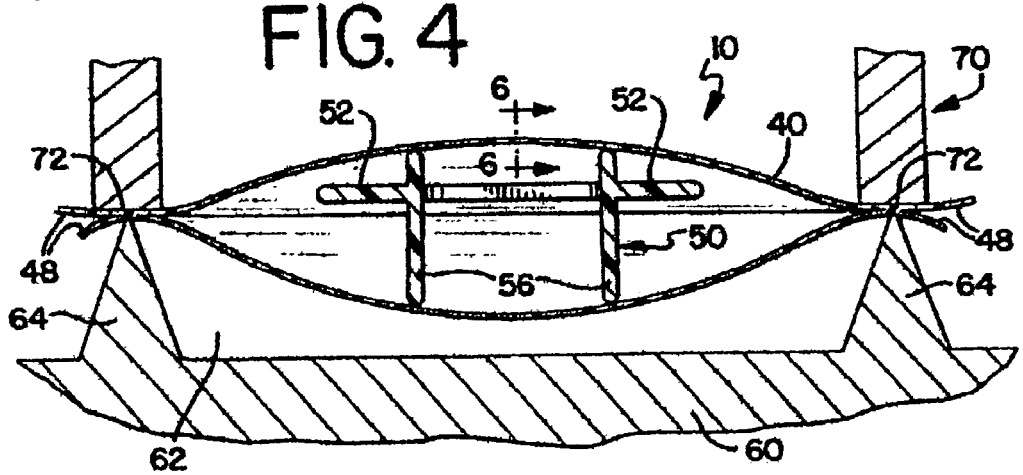
FIG. 4 is a cross-sectional view of the filter of FIG. 3 taken along line 4—4 showing the filter in a welding fixture before marginal edges of the filtration material have been removed.

The filter 10 is made using an ultrasonic welding process. A crucial aspect of the invention is being able to seal the edges of the filtration material at the sides 43, 44, 45 of the filter 10 and at the same time cutting off selvage material 48 outside of the edge seals. It has been found that by proper design of the ultrasonic weld tool and welding nest used in the process, the simultaneous sealing and cutting takes place. FIGS. 4 and 13 best depict the process and the fixture used to assemble the filter 10. In the embodiment shown, a weld nest 60 is made with a cavity 62 bounded on three sides by a welding edge 64. The edge 64 is thus nonlinear, but the welding surface of edge 64 is all formed in one plane as shown. The cavity is configured so that there is clearance 66 at one end to hold the fitment 20 attached to the filter 10. An ultrasonic weld horn 70 is formed in a U-shape, with a generally flat bottom surface 72 for abutting the edge 64. The edge 64 is sized and shaped so as to cause simultaneous cutting and sealing of multiple layers of filtration material 40.

In the preferred embodiment shown, a long, generally rectangular piece of filtration material 40 is folded in its middle, the fold forming one side 46 of the filter. Preferably, the spacer 50 is folded inside and the fitment 20 and wear surface 30 are attached to the filtration material prior to the folding operation. This assembly is slightly larger than the desired finished size of the filter 10. The assembly is held in a closed form, such as by a damp 82 at the side 44 opposite the fold 46, and placed in the weld nest 60. Marginal areas 48 of filtration material 40 extend past the edge 64 of the weld nest 60. The ultrasonic horn 70 and weld nest 60 are brought together, clamping the assembly between them. When the weld horn 70 is sufficiently tight against the edge 64, the ultrasonic welding operation is commenced. Because of the shape of the edge 64, the marginal areas 48 are cut off from the assembly at the same time the edge of the filtration material 40 formed by the severing action are sealed together to form the envelope.

In order to achieve the simultaneous welding and severing, there are several parameters that may need to be adjusted, depending on the other variables. First, the nature of the material to be welded has to be taken into consideration. The filtration material 40 must be of a construction that it can be ultrasonically welded together. Most filtration materials made at least in part of thermoplastic material are capable of being welded together. Next, the shape of the edge 64 and bottom surface 72 of the of the horn 70 must be appropriate, as will be discussed below. Finally, the welding pressure, amplitude and duration must be appropriately selected.

It has been found that if the edge 64 is too sharp, severing will occur without forming a weld. On the other hand, if the edge is too flat, excessive welding times may be required to achieve the severing action, and the final remaining weld may not be sufficiently strong.

In the presently preferred embodiment of the filter 10, a depth filtration media is used. The preferred filtration material is a composite (FIG. 6) of a mesh screen 43 and a stratified spun-bond polyester material 47 laminated together with point bonds 41. The preferred depth filtration material 40 is obtainable from Hollingsworth & Vose, Floyd Industrial Park, Floyd, Va. 24091, as grade CM 0606 ON. This material has a basis weight of about 200–250, preferably about 226 grams per square meter (gsm) and a thickness of about 35–45, preferably about 40 mils. Also, the material has an air permeability rating of about 46 to about 88, preferably about 67 cfm. The outside mesh screen of this material is believed to be an extruded mesh provided by Nalle Plastics of Austin, Tex. under the trademark Naltex® (registered trademark of U.S. Netting Incorporated, d/b/a Nalle Plastics).

Each side of the preferred welding horn 70 has a width of about ¼ inch. The bottom face 72 is preferably smooth; however, a knurled surface may also be used. The weld horn is preferably made from titanium.

Figure 8:
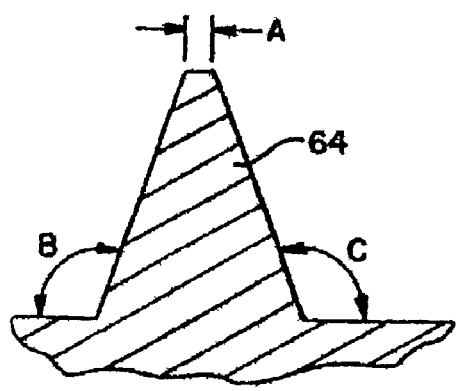
FIG. 8 is a cross-sectional view of the edge portion of the weld nest of FIG. 7.

The edge 64 initially was made with a sharp point. However, it was found that a more blunt surface provided a better weld for the filtration material and welding parameters being used to make the preferred filter 10. The preferred edge 64 has a cross-section which is generally in the form of an isosceles triangle with the apex abutting the flat surface 72 of the welding horn 70. FIG. 8 shows the preferred shape of the edge 64. With the apex of the triangle flat, the cross-section of the edge forms a trapezoid. Angles C and B are both 110°. The triangle thus has internal bottom angles of 70°. Dimension A is 0.012 inches. Using this weld horn and edge configuration with the above described preferred filtration material 40, a welding amplitude of 0.0015 inches and a duration of 5.00 sec. is preferred when using a model 900 (2 kw, 20 kHz) ultrasonic welder from Branson, Danburry, Conn. with a model 920, 220V power supply with a 921 AES actuator with ground detection. The horn is matched with a silver 1:2 aluminum booster. The welding nest 60 with the preferred dimensions in the area of the clearance 66 are shown in the cross-section of FIG. 7. The preferred dimensions shown are:

| | |
|---|---|
| A | 0.012 inches |
| C | 110° |
| P | 0.113 inches |
| Q | 0.110 inches |
| R | 0.075 inches |
| S | 0.153 inches |
| T | 0.060 inches |
| U | 0.128 inches |

The welding nest 60 is manufactured from hardened A-2 steel. The welder is set with a trigger force of 30 psi and a down speed of 4.5 in./sec. and a scrub time of 0.500 mins. With other filtration materials, other parameters may be preferred, but will generally be in the range of 1–5 seconds of weld time, 0–0.5 seconds scrub time, 10–75 psi trigger force and a down speed of 0.5–5.0 in./sec.

Figure 9:
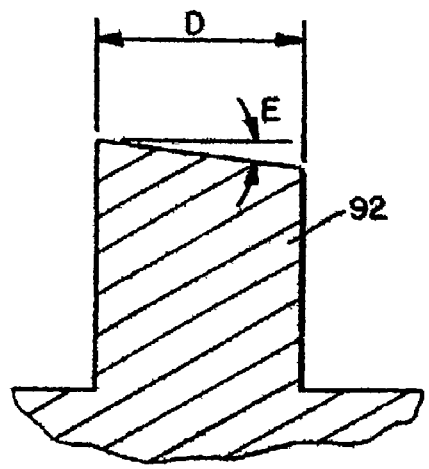
FIGS. 9–12 are cross-sectional views of alternate embodiments of an edge portion of a weld nest similar to FIG. 8.
Figure 10:
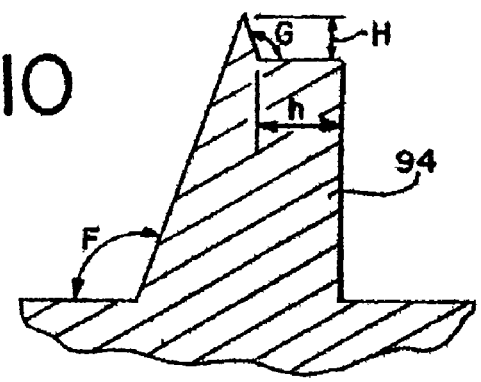
Figure 11:
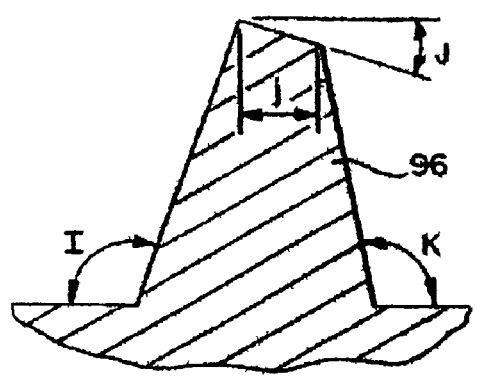
Figure 12:
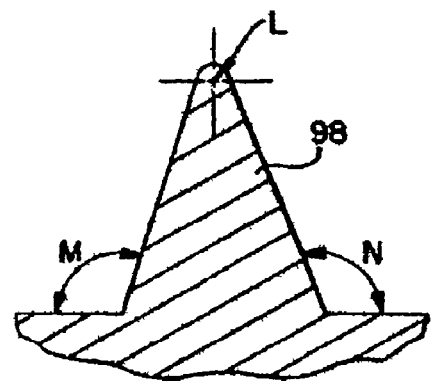

With other types of filtration material, other edge shapes may be preferred. For example, if a thinner filtration material were being used, it may be preferable to design the edge 64 with the same dimension A, but a wider angle for C. Also, entirely different profiles may be preferred with different filtration materials. FIG. 9 shows the shape of an alternate edge 92. The edge 92 has a shape wherein the cross-section is a four sided polygon, with two sides and the base having 90° corners and the top side formed at an angle of between about 5° and about 70° from a line parallel with the base. Other alternative edge shapes 94, 96 and 98 are shown in FIGS. 10–12. Edge 98 shown in FIG. 12 is again generally in the shape of an isosceles triangle, but with a rounded top. The radius of the rounded top is preferably between about 0.1 and about 0.01 inches. Ranges for the dimensions of the shapes of the edges 64, 92, 94, 95, 98 are given below:

EDGE 64

Dim. A: 0 to 0.030" Dependent on filtration material thickness and density. This dimension will have an effect on tool life.

Dim B & C: 90 to 170° Dependent on filtration material thickness, density and the width of desired seal. Variation in angle or combinations thereof will result in variations in the width of desired seal area. This dimension will have an effect on tool life.

EDGE 92

Dim. D: 0.020 to 0.500" Dependent on filtration material thickness, density and the width of desired seal. Variation in width or in combination with Dim. E will result in variations in the width of desired seal area. This dimension will have an effect on tool life.

Dim. E: 5 to 70° Dependent on filtration material thickness, density and the width of desired seal. Variation in angle in combination with Dim. D will result in variations in the width of desired seal area. This dimension will have an effect on tool life.

EDGE 94

Dim. F & G: 90 to 170° Dependent on filtration material thickness, density and the width of desired seal. Variation in angle or combinations thereof will result in variations in the width of desired seal area. This dimension will have an effect on tool life.

Dim. H: 0.002 to 0.200" Dependent on filtration material thickness, density and the width of desired seal. Variation in width or in combination with Dim. h (0.01" to 0.05") will result in variations in the width of desired seal area. This dimension will have an effect on tool life.

EDGE 96

Dim. I & K: 90 to 170° Dependent on filtration material thickness, density and the width of desired seal. Variation in angle or combinations thereof will result in variations in the width of desired seal area. This dimension will have an effect on tool life.

Dim. J: 1 to 60° Dependent on filtration material thickness, density and the width of desired seal. Variation in width or in combination with Dim. j (0.01" to 0.05") will result in variations in the width of desired seal area. This dimension will have an effect on tool life.

EDGE 98

Dim. L: 0.010 to 0.100" Dependent on filtration material thickness and density. This dimension will have an effect on tool life.

Dim. M & N: 90 to 170° Dependent on filtration material thickness, density and the width of desired seal. Variation in angle in combination with Dim. L and thereof will result in variations in the width of desired seal area. This dimension will have an effect on tool life.

In the preferred embodiment, the edge 64 is formed on the weld nest 60. However, it is possible to form the edge on the weld horn, in which case the horn would be made from CPM-10V hardened steel or other hard metal that can transfer ultrasonic energy. The nest should then be formed with a flat face made of a softer material that can be resurfaced as needed.

The seal width should be kept to a minimum. Seal widths that yield the highest weld joint strength are preferred in comparison to seal widths with lower weld joint strengths. An increased width of seal will reduce effective filtration area and will require more time and energy during the weld process. Therefore, an increased width of seal will reduce tool life and decrease utilization of the filtration media. The preferred weld will normally have a width of between about 0.01 and about 0.05 inches.

Instead of making a filter from a folded piece of filtration material, two or more layers of filtration material (of the same or different types) may be cut into individual pieces that are stacked on top of one another to form the filter assembly. Of course, in that case, the multiple layers of filtration material would need to be sealed on all sides as there would not be one side formed by a fold. Of course, rather than being a rectangular shape, the filter could be round or some other shape and the sides could be formed as one continuous curve or even several discontinuous curves.

The preferred method of attaching the fitment 20 and wear surface 30 onto the filtration material 40 is insert molding, as shown in FIG. 5. The filtration material 40 is cut into a strip and the opening 42 punched out, preferably in one stamping operation. The resulting filter blank is then placed in an injection mold in a laid-open configuration. The fitment 20, spacer 50 and wear surface 30 are all molded in one shot, with the molten plastic infusing through the fibers of the filtration material. When the injection molded plastic is cooled, the fold 46 is made so as to align the wear surface 30 under the fitment 20. As seen in FIG. 5, the fitment 20 preferably has flanges that are larger than the opening, covering both surfaces of the layer of filtration material. The edges of filtration material 40 surrounding the opening 42 are captured in the solidified plastics with the flanges being bonded together through the filtration material. Alternatively, the fitment and spacer can be molded separately and welded to one another through the filtration material 40, and top and bottom wear surface parts welded together to form the wear surface 30. The spacer 50 is preferably made with two long sides 52 (FIGS. 3 and 4), having crossbars 54 between them, and legs 56 extending perpendicular to the sides 52 at spaced intervals. Of course, other shapes of internal spacers may be used, and some filters may not need internal spacers.

At the end of the filter where the fitment 20 joins, the spacer 50 has a circular end With three legs 58 (FIG. 5) spaced at 120° intervals around the outside of the circle, and an opening in the circle forming part of the fuel outlet hole through the fitment 20. The legs 58 engage the wear surface 30. The preferred fitment 20 has apertures and shapes appropriate for connection to the fuel pump to which it is intended to be connected.

One of the benefits of the present invention is that less filtration material is consumed in the manufacturing process. When an ultrasonic welding operation was used to make a similar filter but not using the present invention, a ¼ inch strip of filtration material around the perimeter of the filter was made unusable by the forming process. Using the present invention, more of the filtration material remains useable as the ultrasonic weld is narrower, but just as strong. Also, since the marginal areas are trimmed off in the same step as the severed edges of filtration material are welded together, one does not need to have a wide seal to leave room for a later trimming operation. If the welding and trimming are done at different times, a wider band of filtration material is usually used because the trimming operation does not have tight tolerances, and an error in trimming could then puncture the envelope, making the filter unusable.

The preferred plastic for making the fitment 20, wear surface 30 and spacer 50 is an acetyl material approved for use with fuels containing alcohol.

Other filtration materials that have been successfully used with the present invention include 70 and 48 micron woven nylon filtration materials designated as: PA 70µ 6 mill NY #111-679 and PA 48µ NY #6077710 from Industrial Fabrics Crop.

It should be appreciated that the products, apparatus and methods of the present invention are capable of being incorporated in the form of a variety of embodiments, only a few of which have been illustrated and described above. The invention may be embodied in other forms without departing from its spirit or essential characteristics. For example, the filtration material could be a screen or other media, rather than a depth filtration material. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A filter comprising:
   a) at least two surperposed layers of filtration material, each superposed layer having superposed side edges, and one of the layers having an opening there through spaced inwardly from the side edges;
   b) the superposed side edges of the two superposed layers each having been formed by an ultrasonic weld tool severing a marginal area from a larger piece of filtration material;
   c) the superposed side edges being sealed together by the ultrasonic weld tool simultaneously sealing the edges as they are formed by said severing, the weld formed in the superposed side edges defining a sealed severed edge; and
   d) the filtration material having a fitment attached thereto in the area of said opening, the fitment having flanges that are larger than the opening, covering both surfaces of the layer of filtration material, thus completely surrounding the opening.

2. The filter of claim 1 wherein the filter is in the form of an envelope made of a folded piece of filtration material, the fold providing one side of the filter and the sealed severed edges forming remaining sides of the filter.

3. The filter of claim 1 wherein the filter comprises a fuel tank filter.

4. The filter of claim 1 wherein the weld formed in the side edges is all in one plane.

5. The filter of claim 1 wherein the fitment comprises a connector for connecting the filter to a fuel pump.

6. The filter of claim 1 further comprising a wear surface attached to the bottom side of the filter.

7. The filter of claim 1 wherein the filtration material is a depth filtration material.

8. The filter of claim 1 wherein the filtration material comprises a laminate of a mesh screen and a spunbond material.

9. The filter of claim 2 further comprising a spacer inside said envelope.

10. The filter of claim 2 wherein a spacer and the fitment are insert molded so as to be connected to the filtration material before the filtration material is folded over and sealed, the spacer being inside the envelope.

11. The filter of claim 1 wherein the sealed area of the edges is between about 0.01 to about 0.05 inches wide.

* * * * *

UNITED STATES PATENT AND TRADEMARK OFFICE
CERTIFICATE OF CORRECTION

| | |
|---|---|
| PATENT NO. | : 7,083,722 B2 |
| APPLICATION NO. | : 10/243884 |
| DATED | : August 1, 2006 |
| INVENTOR(S) | : Steven B. McGaw, Jr. |

Page 1 of 1

It is certified that error appears in the above-identified patent and that said Letters Patent is hereby corrected as shown below:

<u>In the Claims</u>

Columns 7-8, in claim 1, line 11, after "simultaneously sealing the" insert --superposed--.

Signed and Sealed this

Eleventh Day of March, 2008

JON W. DUDAS
*Director of the United States Patent and Trademark Office*